(12) United States Patent
Fisk

(10) Patent No.: US 10,913,598 B2
(45) Date of Patent: Feb. 9, 2021

(54) CONNECTOR APPARATUS

(71) Applicant: C. Tyson Fisk, Coarsegold, CA (US)

(72) Inventor: C. Tyson Fisk, Coarsegold, CA (US)

(*) Notice: Subject to any disclaimer, the term of this patent is extended or adjusted under 35 U.S.C. 154(b) by 90 days.

(21) Appl. No.: 16/058,930

(22) Filed: Aug. 8, 2018

(65) Prior Publication Data
US 2020/0047994 A1 Feb. 13, 2020

(51) Int. Cl.
*B65F 1/00* (2006.01)
*B60P 7/135* (2006.01)
*B65F 1/14* (2006.01)

(52) U.S. Cl.
CPC ............ *B65F 1/0053* (2013.01); *B60P 7/135* (2013.01); *B65F 1/1468* (2013.01); *B65F 2001/0086* (2013.01)

(58) Field of Classification Search
CPC .................. B65F 1/0053; B65F 1/1468; B65F 2001/0086; B60P 7/135
USPC .......................................................... 220/23.4
See application file for complete search history.

(56) References Cited

U.S. PATENT DOCUMENTS

| | | | |
|---|---|---|---|
| 4,384,817 A * | 5/1983 | Peterson | B60P 3/125 280/402 |
| 9,868,326 B2 * | 1/2018 | Najarro | B60D 1/04 |
| 9,908,738 B1 * | 3/2018 | Toth | B65H 49/28 |

* cited by examiner

*Primary Examiner* — Anthony D Stashick
*Assistant Examiner* — James M Van Buskirk
(74) *Attorney, Agent, or Firm* — Buchalter, A Professional Corp; Sean Casey

(57) ABSTRACT

The apparatus is a grappling device that allows multiple trash bins or material movers to be linked together so that all can be moved simultaneously to the curb and removed after emptying. The apparatus is a removable connector that is coupled to a vehicle at one end and engages a handle of a bin or suitable material mover at the other. Additional refuse/recycle bins can be linked into the train configuration with robust tie-downs, such as bungee cords, EPDM Trucker's cords, and the like.

20 Claims, 3 Drawing Sheets

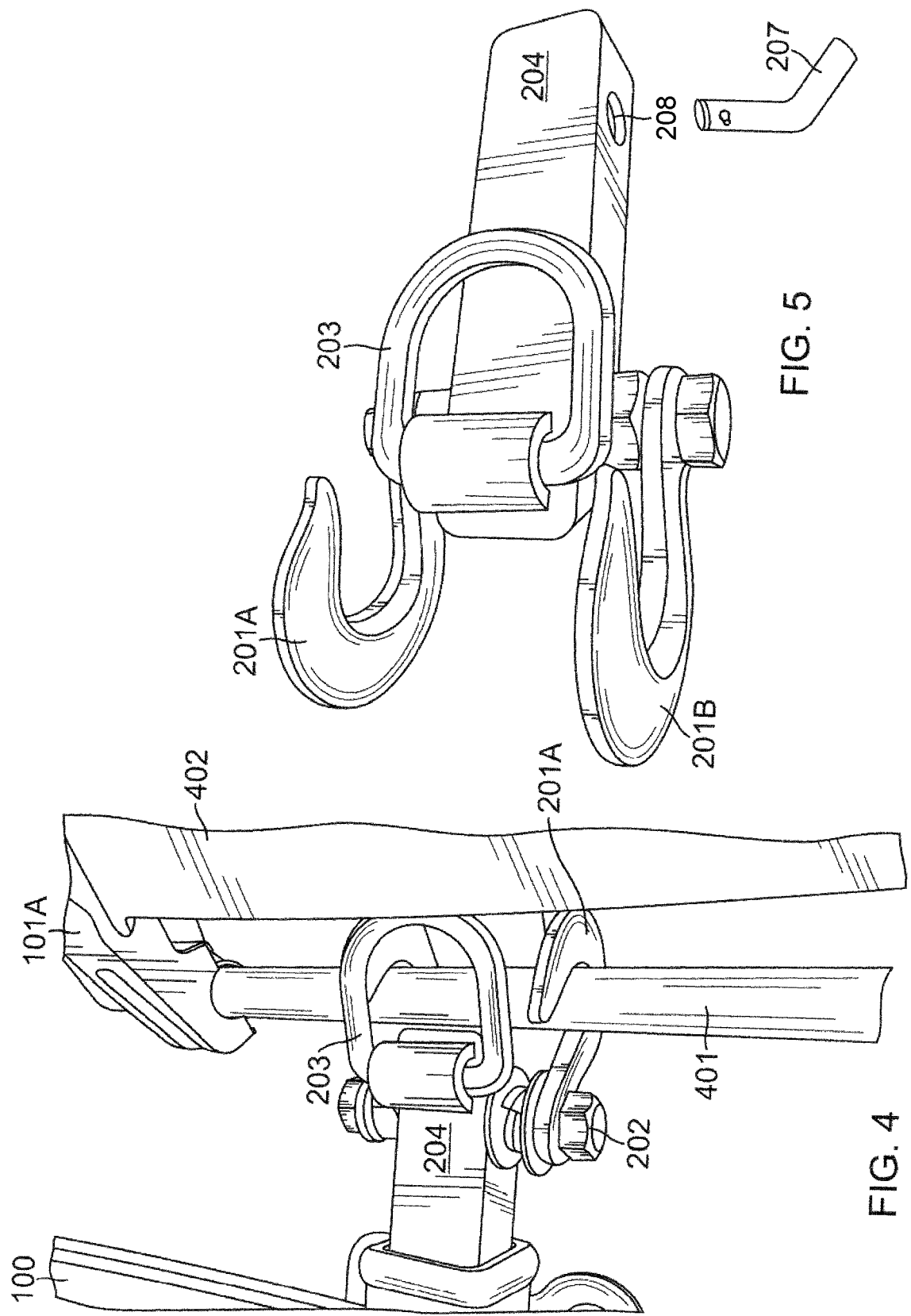

CONNECTOR APPARATUS

BACKGROUND

Many municipalities require residents to use large wheeled garbage bins for trash collection. Often these bins are color coded to represent different types of trash materials. For example, black bin might be for general trash and refuse. A green bin may be for plant material, such as grass cuttings, trimmed branches, weeds, and the like. A blue bin may be for recyclable materials such as plastic, glass, cardboard, metal, and the like. The bins are large and heavy when full.

Typically trash collection for a resident is one day a week, and the bins must be placed at the curb in front of the home so that sanitation workers can collect the trash from the bins. Some homes, particularly in areas with large or steep and winding lots, may be quite distant from the curb, so that moving the bins to the street can be a time consuming and difficult chore. The bins are not permitted to simply be kept at the curb, but must be removed soon after the trash has been picked up. This means a weekly routine of moving several large and heavy bins to the curb, and removing them the next day.

SUMMARY

The apparatus is a connector or grappling device that allows multiple trash bins to be linked together so that all can be moved simultaneously to the curb and removed after emptying. The apparatus is a removable connector that is coupled to a vehicle at one end and engages a handle of a bin at the other, Additional bins can be added to form a train with simple tie-downs, such as bungee or EPDM trucker's cords. The apparatus can also be used to transport materials on skids, pallet trucks or jacks, dollies, carts or wagons, and for towing and recovery applications.

BRIEF DESCRIPTION OF THE DRAWINGS

FIG. 4 is a top view of the apparatus of FIG. 2 attached to a bar of a trash bin.

FIG. 5 is a top view of the apparatus.

DETAILED DESCRIPTION

Figure 1:
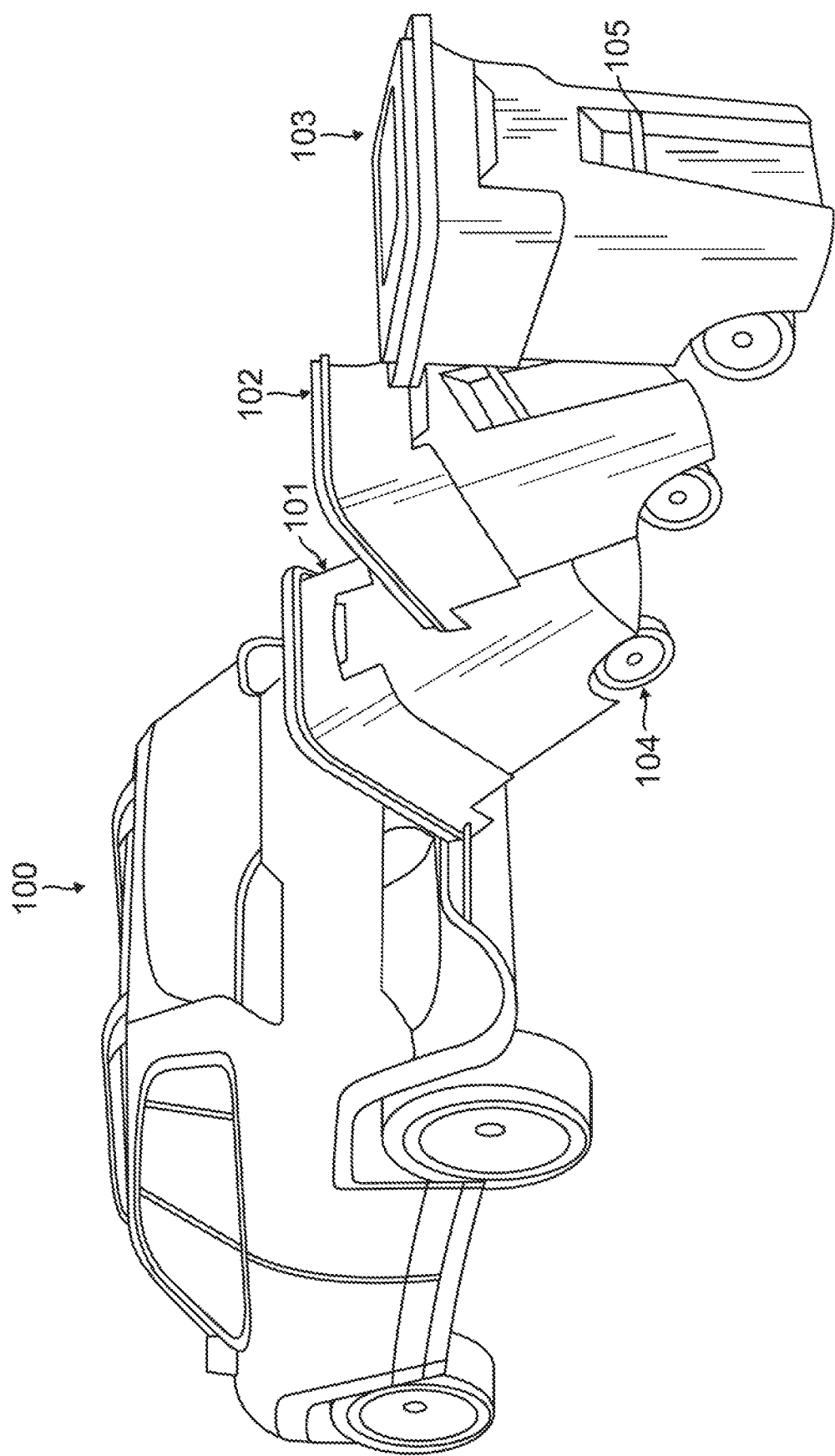
FIG. 1 is a view of a vehicle pulling a train of trash bins using the apparatus.

The apparatus provides a reliable fastening means for a plurality of items, including, but not limited to, a trash bin. FIG. 1 is an example of the apparatus in use in connecting a plurality of bins. A vehicle 100 uses the apparatus to couple the rear of the vehicle to a first bin 101. The bin 101, in turn, is coupled to a second bin 102. The second bin 102 may itself be coupled to a third bin 103. As the vehicle moves, the bins are pulled along together on their wheels 104. Each bin has a cross member 105 which may be coupled to a handle of the adjoining bin to create a connected train of bins.

Figure 2:
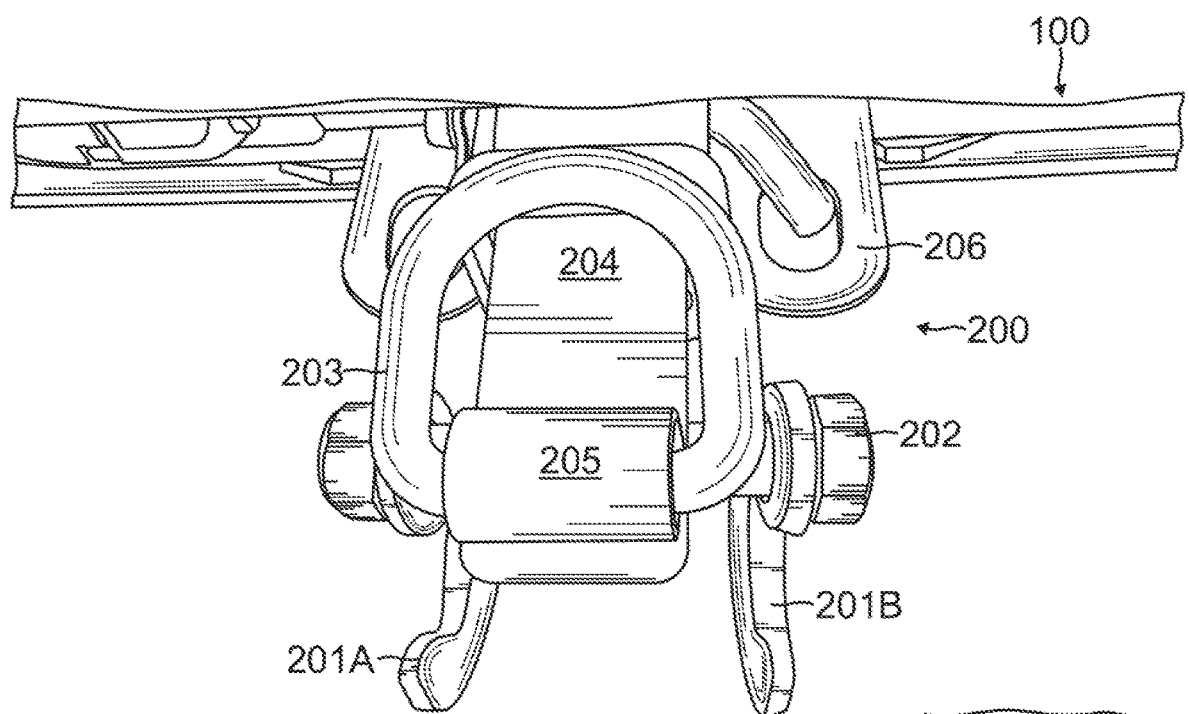
FIG. 2 is a top view of the apparatus hooked to the vehicle.
Figure 3:
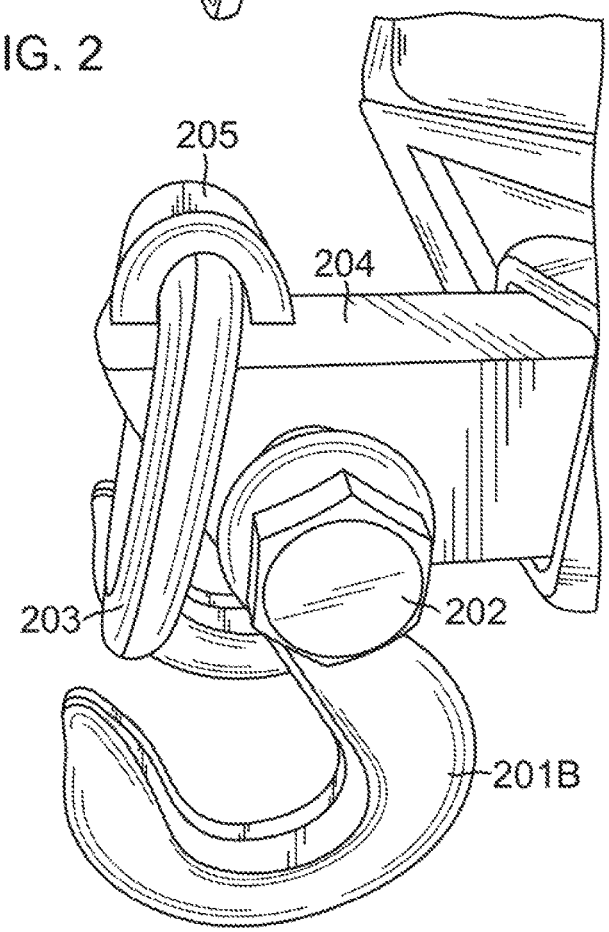
FIG. 3 is a side view of the apparatus of FIG. 2.

FIG. 2 illustrates a top view of the apparatus while connected to a vehicle 100. FIG. 3 illustrates a side view of the apparatus of FIG. 2. The apparatus 200 comprises a pair of hooks 201A and 201B which pivot about fastener 202. The fastener 202 may be a through-bolt or some other means to rotatably attach the hooks 201A and 201B. The apparatus 200 also includes a D-ring 203 rotatably mounted in a collar 205. When in use, the D-ring 203 can be rotated towards the hooks to help keep whatever is in the hooks in place. The D-ring 203 can be mounted with somewhat of a friction fit so that it tends to stay in the chosen location without much movement, further securing the load in the hooks. In one embodiment, the D-ring 203 provides a tie down point to further secure an item to the apparatus. A rectangular shaft 204 engages a connection 206 on the vehicle 100 to secure the apparatus 200 to the vehicle 100.

FIG. 4 illustrates the apparatus 200 engaged with a bin 101A. The hooks 201A and 201B receive a handle 401 on the top of the bin 101A near a lid 402. The D-ring 203 is moved to the top of the handle 401 to retain the handle in place in the hooks during transport. The apparatus 200 is coupled via shaft 204 to vehicle 100. The shaft 204 is coupled thereto with a heavy pin 207 secured with a cotter pin, or by some other fastening means received within through-hole 208 as shown in FIG. 5.

The shaft 204 is such that a user can stand on the shaft to reach a roof or roof rack of the vehicle as desired. In one embodiment, the apparatus is comprised of specially coated steel. Additional bins can be added to the train by coupling the cross member 105 of one bin to the handle 401 of a next bin, using any suitable tie down including bungee or EPDM trucker's cords, chains, rope, and the like. Additionally, this apparatus can be used to transport materials on skids, pallet trucks or jacks, dollies, carts or wagons, and for towing and recovery operations.

What is claimed is:

1. An apparatus comprising:
   a shaft having a first end and a second end;
   a pair of hooks rotatably mounted at the first end of the shaft;
   a D-ring rotatably mounted at the first end of the shaft adjacent the pair of hooks; and
   a heavy pin receivable at the second end of the shaft configured to couple the apparatus to a vehicle.

2. The apparatus according to claim 1, further comprising:
   a fastener received within a through hole formed in the first end of the shaft; and
   the hooks rotatably mounted by the fastener about opposite sides of the shaft.

3. The apparatus according to claim 1, further comprising:
   a collar carried from the first end of the shaft, received with the D-ring in a friction fit relationship to resist movement relative to at least one of the pair of hooks and shaft.

4. The apparatus according to claim 3, further comprising:
   the collar and through hole being positioned relative to the pair of hooks such that the D-ring is rotatable into a position proximate the hooks to retain a handle received within the hooks.

5. The apparatus according to claim 1, further comprising:
   a fastener received within a through hole formed in the first end of the shaft and rotatably mounting the pair of hooks;
   a collar carried from the first end of the shaft, received with the D-ring in a friction fit relationship to resist movement relative to at least one of the pair of hooks and shaft; and
   the collar and through hole being positioned relative to the pair of hooks such that the D-ring is rotatable into a position proximate the hooks to retain a handle received within the hooks.

6. The apparatus according to claim 1, further comprising:
a fastener received within a through hole formed in the first end of the shaft;
the pair of hooks rotatably mounted by the fastener about opposite sides of the shaft; and
a collar carried from the first end of the shaft, and the D-ring captured by the collar in a friction fit relationship to resist movement relative to at least one of the pair of hooks and shaft.

7. The apparatus according to claim 1, further comprising:
a fastener received within a through hole formed in the first end of the shaft, configured to rotatably mount the pair of hooks about opposite sides of the shaft; and
the D-ring configured to be rotated into a position adjacent the hooks to retain a handle received therein.

8. The apparatus according to claim 1, further comprising:
the D-ring positioned about the first end of the shaft relative to the pair of hooks to be rotated into a position adjacent the hooks to retain a handle received therein.

9. The apparatus according to claim 1, further comprising:
the D-ring captured in a friction fit relationship relative to the first end of the shaft, and positioned thereon relative to the pair of hooks, to be rotated into a position adjacent the hooks to retain a handle received therein.

10. An apparatus comprising:
a shaft having a first end and a second end each with respective through holes;
a pair of hooks rotatably mounted by a fastener captured by the through hole of the first end of the shaft; and
a D-ring rotatably mounted in a friction fit relationship at the first end of the shaft, adjacent the pair of hooks.

11. The apparatus according to claim 10, further comprising:
the hooks rotatably mounted by the fastener about opposite sides of the shaft.

12. The apparatus according to claim 10, further comprising:
a collar carried from the first end of the shaft, received with the D-ring to establish the friction fit relationship.

13. The apparatus according to claim 12, further comprising:
the collar and first end through hole being positioned relative to the pair of hooks such that the D-ring is rotatable towards the hooks to retain a handle received therein.

14. The apparatus according to claim 10, further comprising:
a collar carried from the first end of the shaft, received with the D-ring to establish the friction fit relationship to resist movement of the D-ring relative to the first end; and
the collar and fastener configured such that the D-ring is rotatable towards the hooks to retain a handle received therein.

15. The apparatus according to claim 10, further comprising:
a heavy pin receivable within a through hole formed at the second end of the shaft, configured to couple the apparatus to a vehicle.

16. An apparatus comprising:
a rectangular shaft having first and second ends each with respective through holes;
at least one hook rotatably mounted by a fastener received within the through hole of the first end of the shaft; and
a D-ring rotatably mounted adjacent to the at least one hook in a friction fit relationship at the first end of the shaft to resist movement relative thereto.

17. The apparatus according to claim 16, further comprising:
a collar carried from the first end of the shaft, received with the D-ring to establish the friction fit and resistance to movement.

18. The apparatus according to claim 17, further comprising:
the collar and fastener configured such that the D-ring is rotatable towards the hook to retain a handle received therein.

19. The apparatus according to claim 16, further comprising:
the hook rotatably mounted by the fastener about a side of the shaft.

20. The apparatus according to claim 16, further comprising:
a collar carried from the first end of the shaft, received with the D-ring to establish the friction fit and resistance to movement, and positioned relative to the at least one hook whereby the D-ring is rotatable towards the at least one hook to retain a handle received therein.

\* \* \* \* \*